(12) United States Patent
Pool

(10) Patent No.: US 7,275,906 B1
(45) Date of Patent: Oct. 2, 2007

(54) WASTE/RECYCLABLES LOADING MACHINE

(75) Inventor: Dennis C Pool, Byron Center, MI (US)

(73) Assignee: SP Industries, Inc., Hopkins, MI (US)

( * ) Notice: Subject to any disclaimer, the term of this patent is extended or adjusted under 35 U.S.C. 154(b) by 0 days.

(21) Appl. No.: 10/895,192

(22) Filed: Jul. 20, 2004

(51) Int. Cl.
*B65F 9/00* (2006.01)
*B65G 67/00* (2006.01)

(52) U.S. Cl. .................................... 414/395; 414/397

(58) Field of Classification Search ............... 414/400, 414/304, 373, 395, 396, 397, 398, 809, 421, 414/345; 100/100, 215, 2, 178, 179, 218, 100/240, 245; 53/529; 198/2 R, 3, 5, 33
See application file for complete search history.

(56) References Cited

U.S. PATENT DOCUMENTS

| | | | | | |
|---|---|---|---|---|---|
| 946,969 | A | * | 1/1910 | Laing | 193/25 R |
| 1,005,939 | A | * | 10/1911 | Clark | 193/5 |
| 3,088,499 | A | * | 5/1963 | Rieger | 141/81 |
| 3,507,409 | A | * | 4/1970 | Gordon | 414/352 |
| 3,621,775 | A | * | 11/1971 | Baker | 100/49 |
| 3,625,139 | A | * | 12/1971 | Gollnick | 100/49 |
| 3,734,005 | A | * | 5/1973 | Vogel | 100/52 |
| 3,750,813 | A | * | 8/1973 | Fishburne | 414/501 |
| 3,815,323 | A | * | 6/1974 | Longo | 53/530 |
| 3,893,385 | A | * | 7/1975 | White | 100/346 |
| 4,044,569 | A | * | 8/1977 | Harza | 62/341 |
| 4,677,909 | A | * | 7/1987 | Beesley et al. | 100/229 A |
| 4,729,304 | A | * | 3/1988 | Gardella et al. | 100/218 |
| 5,148,739 | A | * | 9/1992 | Fox | 100/45 |
| 5,551,336 | A | * | 9/1996 | Griffin et al. | 100/353 |
| 5,694,742 | A | * | 12/1997 | Elliott et al. | 53/436 |
| 6,427,585 | B1 | * | 8/2002 | Brown et al. | 100/41 |
| 6,609,871 | B2 | * | 8/2003 | Pfeiffer et al. | 414/328 |

* cited by examiner

*Primary Examiner*—Patrick Mackey
*Assistant Examiner*—Gregory W Adams
(74) *Attorney, Agent, or Firm*—Van Dyke, Gardner, Linn & Burkhart, LLP

(57) ABSTRACT

A waste loading device for loading waste/recyclables into a container includes a base portion positionable at a loading station, a loading tube extending from the base portion and a pushing member. The loading tube has a discharge end and is configured to be received in a container positioned at the waste/recyclables loading device such that the discharge end is substantially within the container. The discharge end is at an angle relative to a longitudinal axis of the loading tube. The pushing member is movable along the loading tube to push waste along the loading tube to the discharge end and into the container. The discharge opening at the discharge end opens generally downwardly. The loading tube may extend approximately eight feet or more into the container when the container is positioned at the loading device.

28 Claims, 8 Drawing Sheets

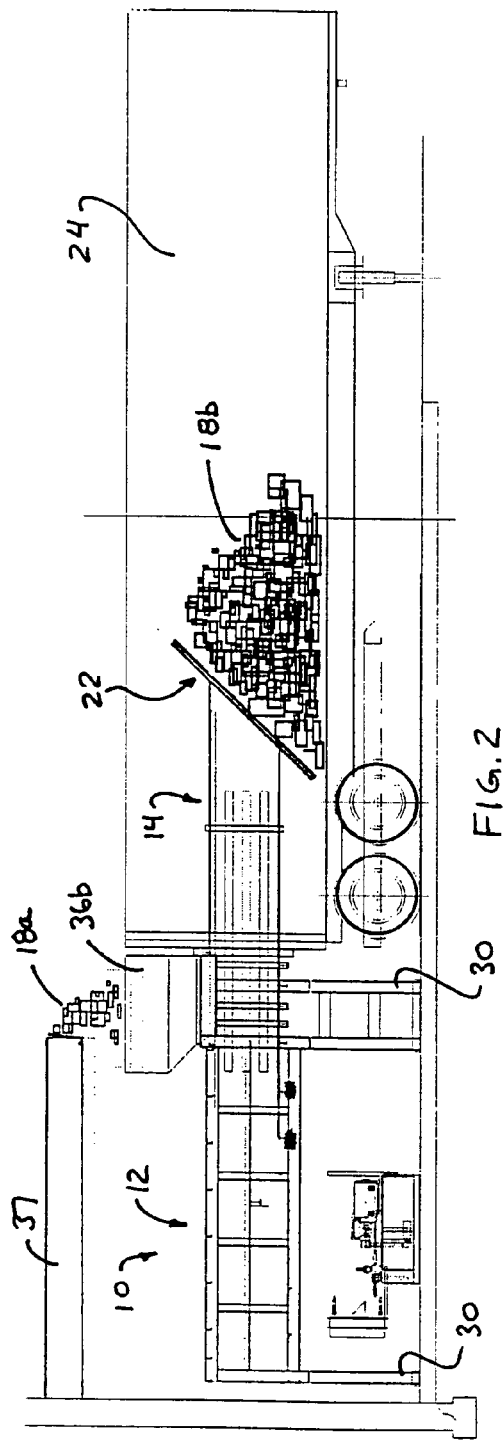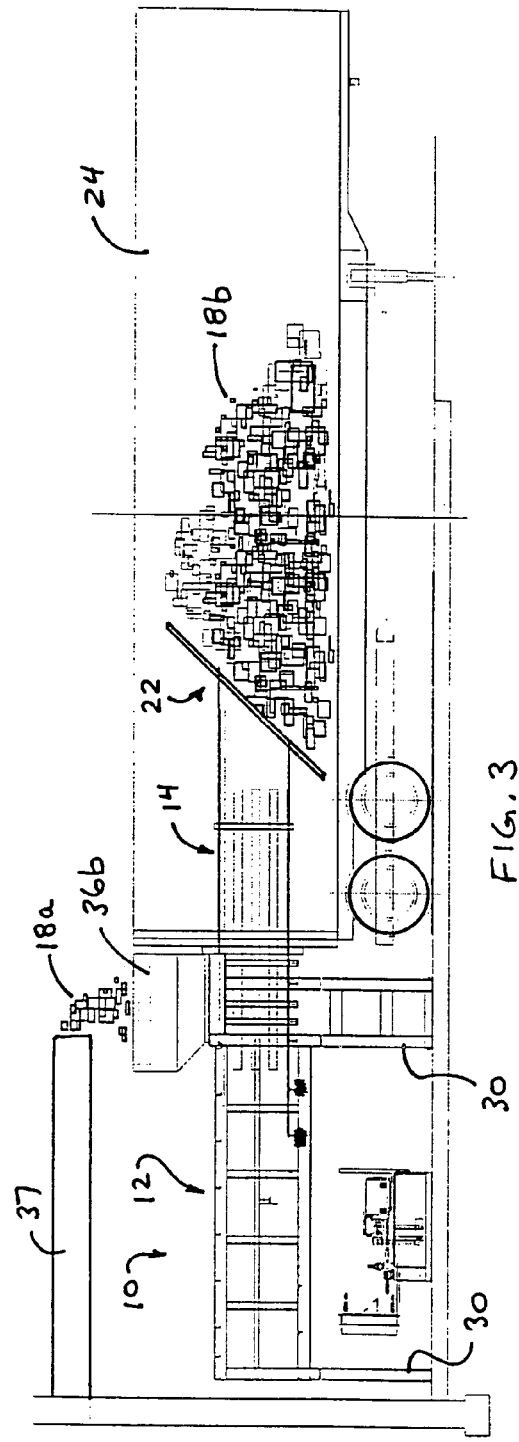

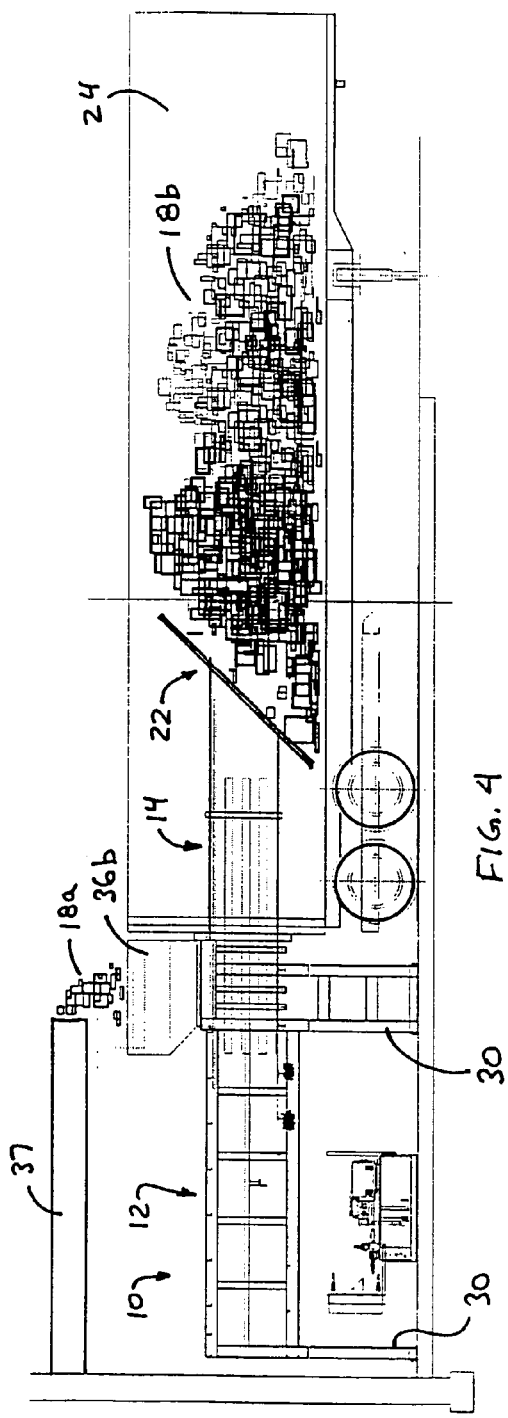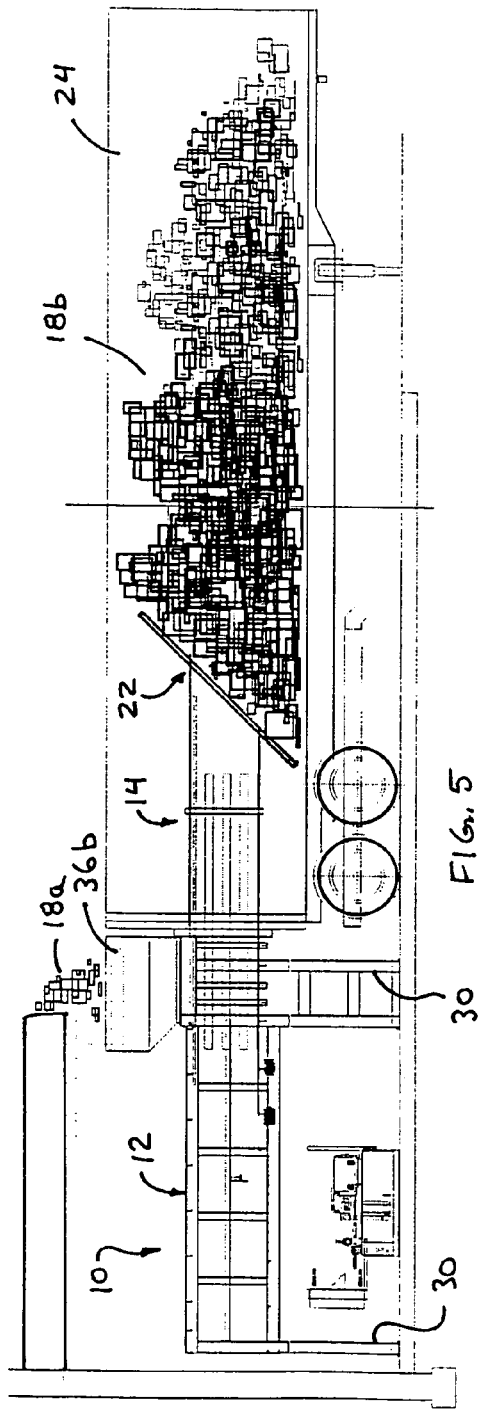

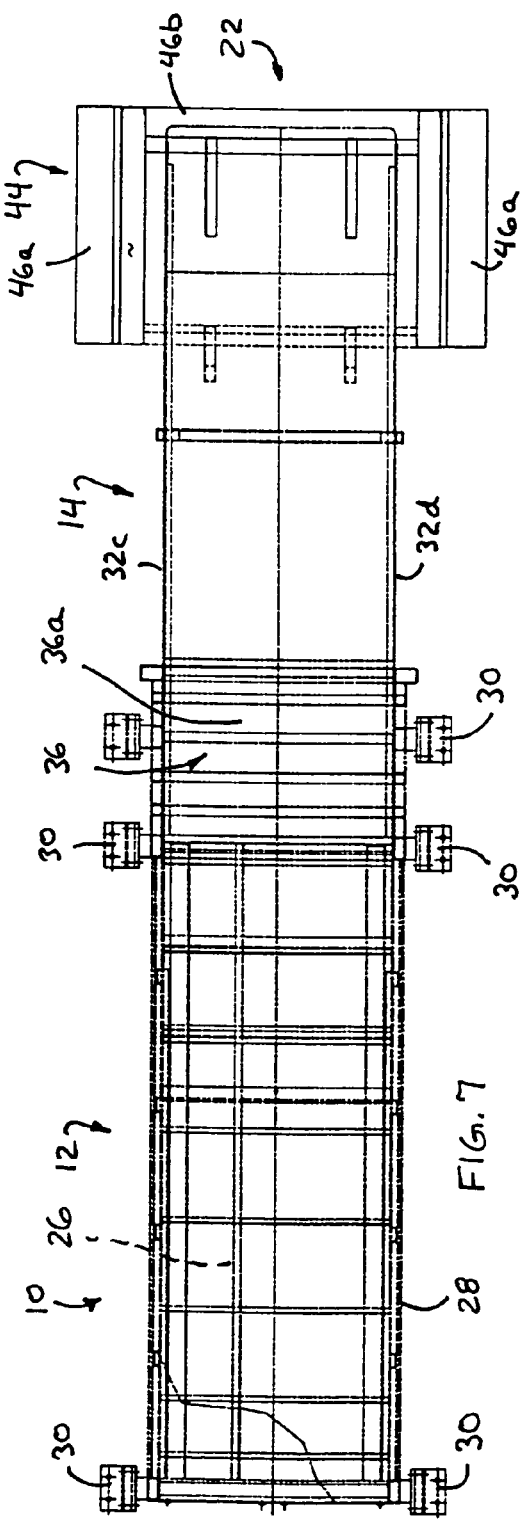
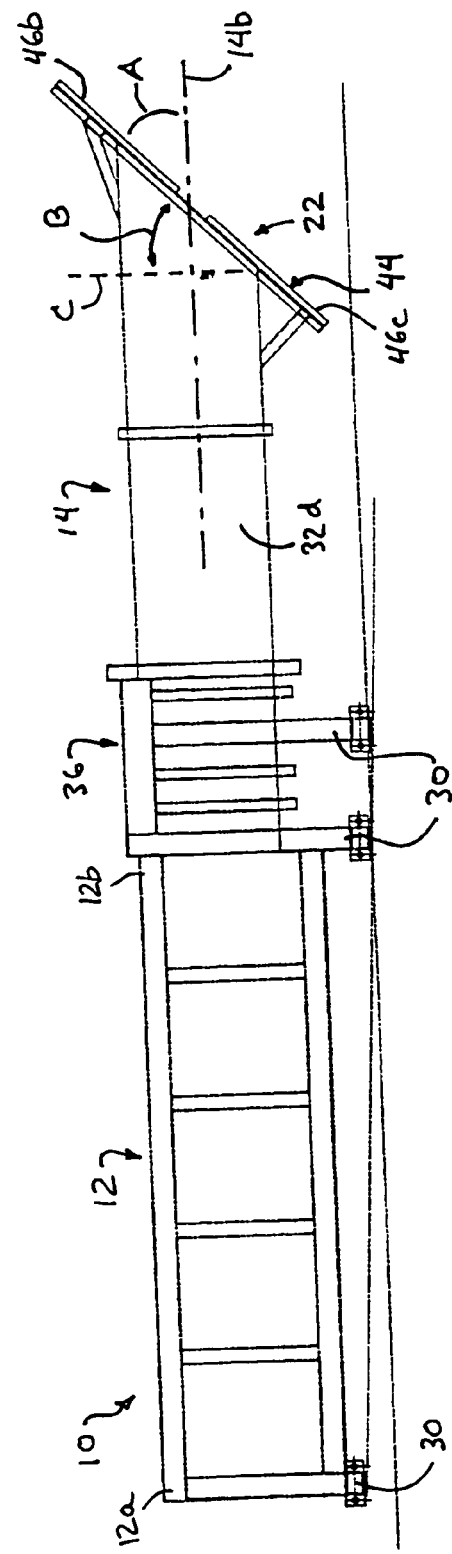

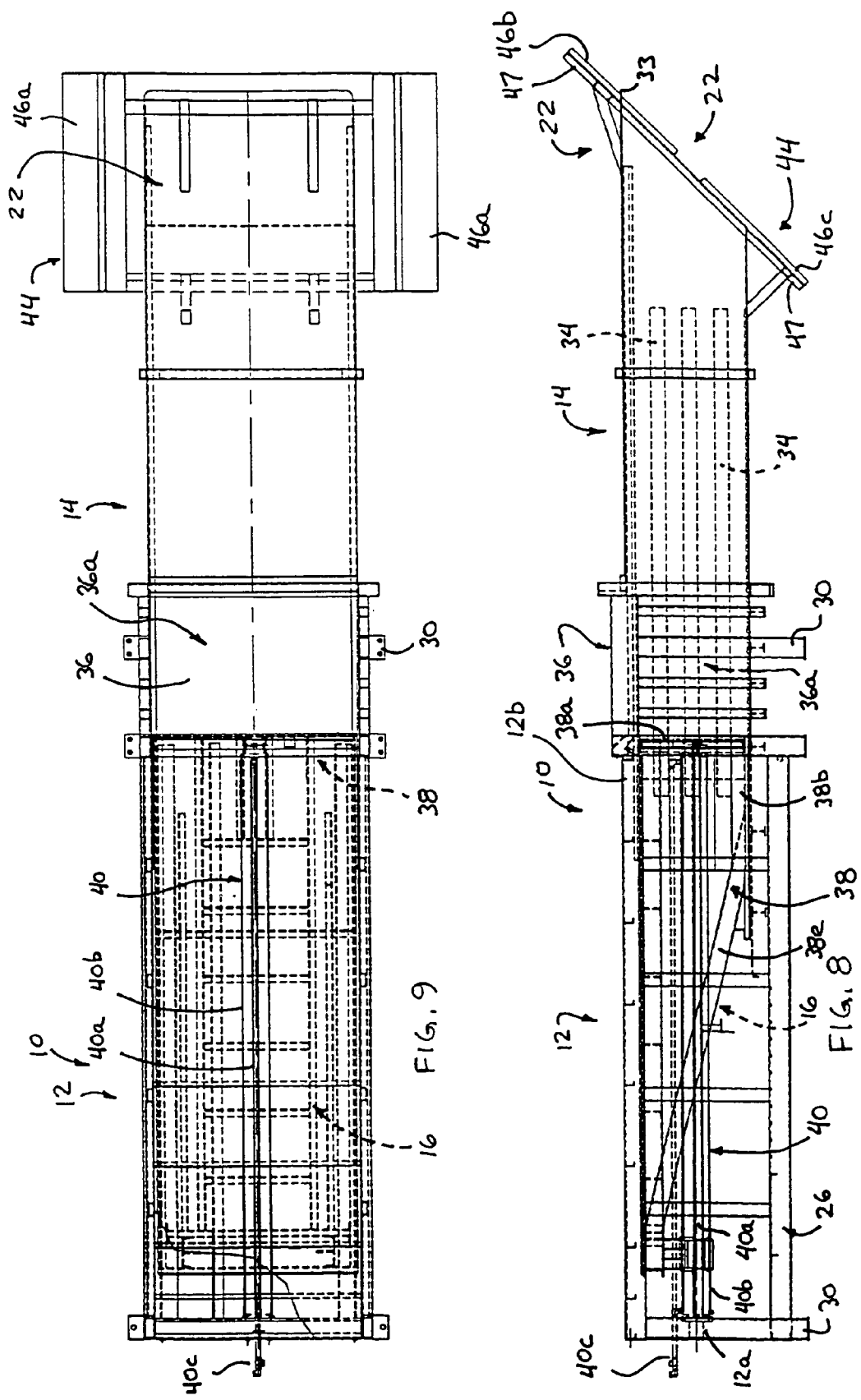

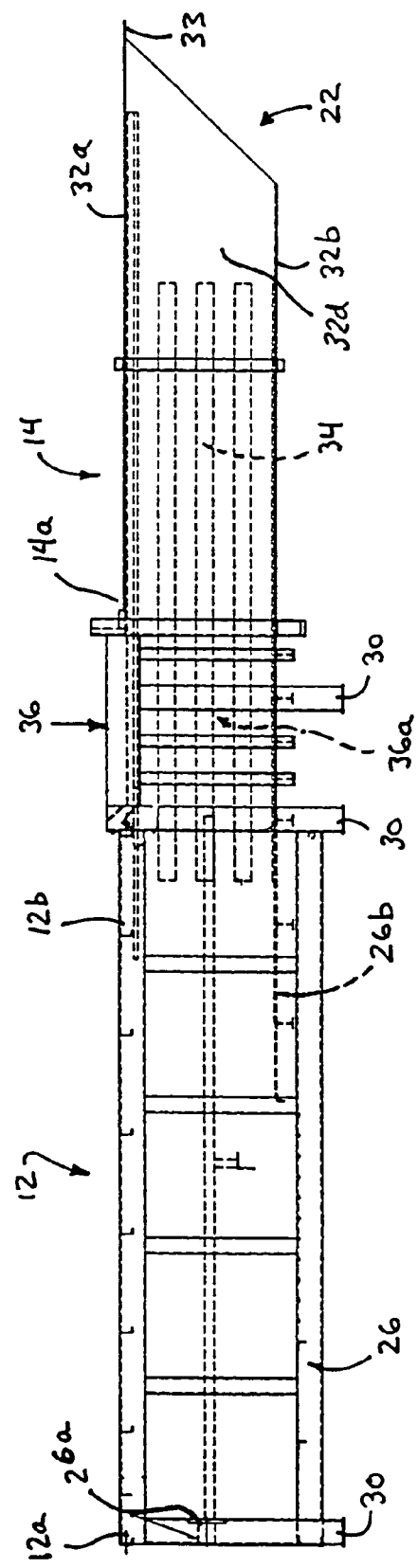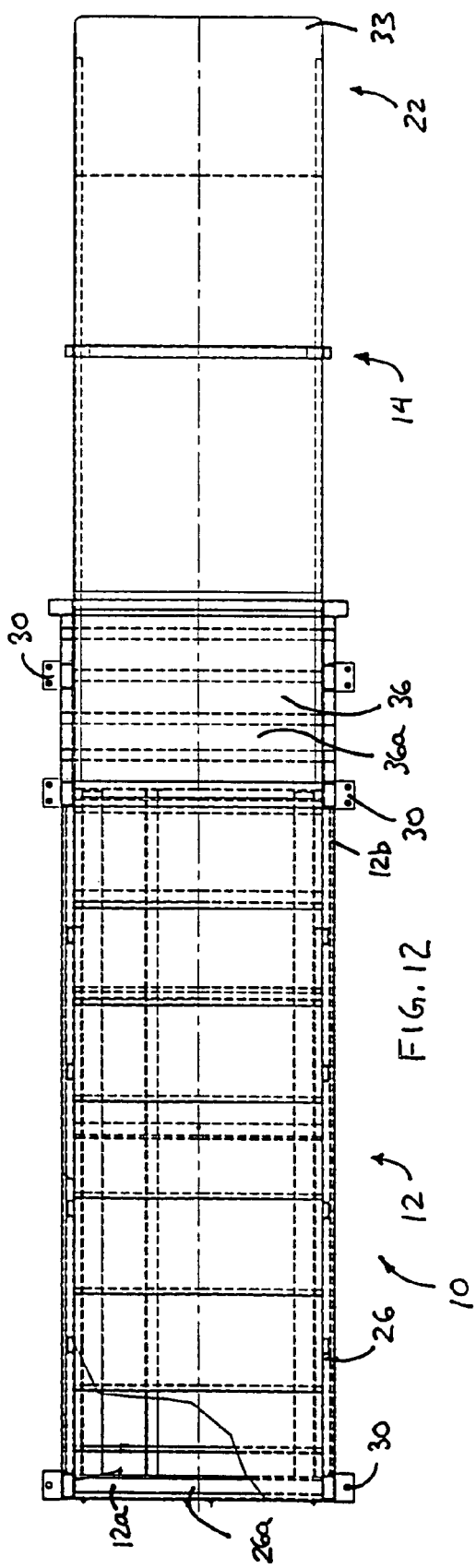

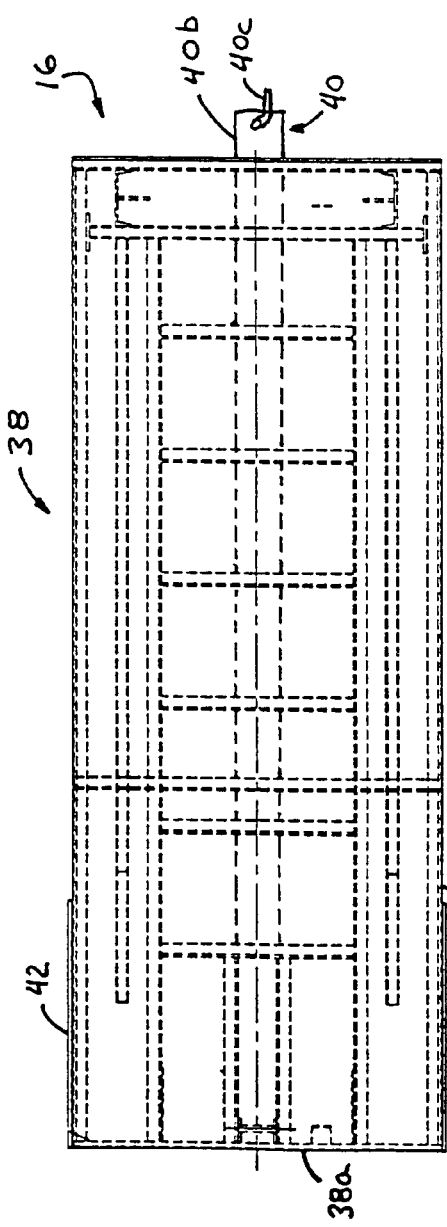
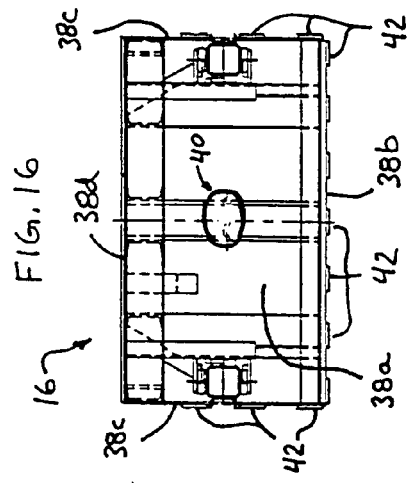
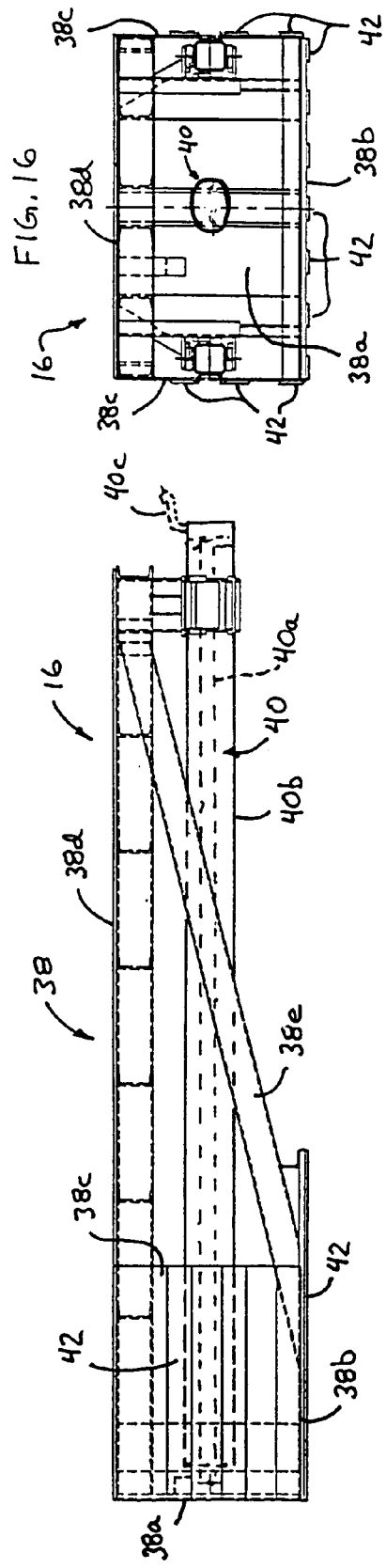

WASTE/RECYCLABLES LOADING MACHINE

FIELD OF THE INVENTION

The present invention relates to waste and/or recyclables loading machines and, more particularly, to waste and/or recyclables loading machines that are operable to load waste or recyclables, such as paper waste or newsprint or the like, into common transport truck trailers or containers without compacting the waste within the trailer or container.

BACKGROUND OF THE INVENTION

It is known in the art to provide a loading device that is operable to load waste and/or recyclables into a common transport truck trailer. Such known loading devices are often received a short ways into the truck trailer, such as about three feet or so into the truck trailer from the rear opening of the trailer. The loading devices discharge waste/recyclable material into the truck trailer until the truck trailer is sufficiently full. Because the loading devices are inserted into the rear opening of the trailer, such as when the rear doors are open, a substantial amount of the discharged waste/recyclables may fall or spill out of the rear of the trailer during loading of the trailer and as the trailer is moved away from the loading device when the loading is complete. Also, during the loading process, the paper may pile up in front of the loading device and may continue to pile up to the ceiling of the trailer as more waste is loaded into the trailer. The high pilings of waste may be difficult to move further into the trailer to effectively and efficiently fill the trailer. Moreover, as the waste piles higher at the discharge of the loading device, more waste may fall or spill toward the open rear end of the trailer and may fall or spill out of the trailer at the loading station or dock.

Therefore, there is a need in the art for a loading device that overcomes the shortcomings of the prior art.

SUMMARY OF THE INVENTION

The present invention provides a waste and/or recyclables loading device that is operable to load waste or recyclables, such as paper waste or newsprint or the like, or glass or other waste or recyclable material or the like, into a container, such as a common transport truck trailer or the like, that is positioned at the loading device. The waste/recyclables loading device includes a loading tube that extends substantially within the truck trailer when the truck trailer is positioned at the device. The loading tube has a downwardly angled discharge end. Waste or recyclable materials thus are discharged well within the truck trailer and in a generally downward direction. The waste/recyclables loading device thus may load a container while limiting upward movement of the discharged waste/recyclable material and while limiting or substantially precluding spillage of the discharged waste/recyclable material from the container or trailer.

According to an aspect of the present invention, a waste or recyclables loading device for loading waste or recyclables into a container includes a base portion positionable at a loading station, a loading tube extending from the base portion and a pushing member. The loading tube has a discharge end and is configured to be received in a container positioned at the waste/recyclables loading device such that the discharge end is substantially within the container. The discharge end is at an angle relative to a longitudinal axis of the loading tube. The pushing member is movable along the loading tube to push waste/recyclables along the loading tube to the discharge end and into the container.

The discharge end may include a flange or lip extending from an upper end of the discharge end. The flange may be configured to limit upward movement of waste/recyclables that is discharged into the container. The waste/recyclables loading device may include a baffle generally around the discharge end to limit movement of waste/recyclables toward the base portion. The baffle may be adjustable to adapt the baffle for different containers.

The base portion may be adjustably positioned at the loading station and may be adjustable to adjust the angle of the longitudinal axis relative to the container. The pushing member may comprise a hydraulic actuator that is operable to extend and retract to move a push plate in response to pressurized fluid.

According to another aspect of the present invention, a method for loading waste/recyclables into a container includes providing a loading device having a base portion and a loading tube extending from the base portion. The loading tube has a discharge end opposite to the base portion. The discharge end is at an angle relative to a longitudinal axis of the loading tube. A container is positioned at the waste/recyclables loading device such that the discharge end of the loading tube is substantially within the container. Waste or recyclables are loaded into the waste/recyclables loading device and are moved along the loading tube to the discharge end and into the container. The waste/recyclables are discharged in a generally downward direction from the angled discharge end. The angled discharged end limits upward movement of the discharged waste/recyclables.

Therefore, the present invention provides a waste/recyclables loading device or machine that is operable to load waste/recyclable material, such as paper waste or newsprint or the like, into a container or truck trailer or the like. The waste/recyclables loading device may be operable to move waste/recyclables along the discharge tube and into the trailer via a hydraulic actuator, which is extendable and retractable to move and discharge the waste/recyclables from the loading tube into the container or trailer. The snout or loading tube extends substantially into the trailer and has an angled discharge end which is directed generally downwardly at an angle toward the floor of the trailer or container, such that the waste/recyclables are discharged generally downwardly into the trailer. The loading tube may include a baffle at the discharge end to limit upward movement of the discharged waste and to limit or substantially preclude the discharged waste/recyclables from moving around the baffle and toward the open rear of the trailer during loading of the trailer. The waste/recyclables loading device thus is operable to discharge waste recycled into a truck trailer and limits or substantially precludes spillage of the waste/recyclables from the trailer when the trailer is removed from the waste/recyclables loading device.

These and other objects, advantages, purposes and features of the present invention will become apparent upon review of the following specification in conjunction with the drawings.

BRIEF DESCRIPTION OF THE DRAWINGS

FIGS. 2-5 are side elevations showing the waste/recyclables loading device while loading a common transport truck trailer;

FIG. 6 is a side elevation of a waste/recyclables loading device of the present invention;

FIG. 7 is a top plan view of the waste/recyclables loading device of FIG. 6;

FIG. 8 is a side elevation and partial sectional view of a waste/recyclables loading device of the present invention;

FIG. 9 is a top plan view and partial sectional view of the waste/recyclables loading device of FIG. 8;

FIG. 11 is a side elevation and partial sectional view of a base portion and loading tube of the waste/recyclables loading device of FIGS. 8-10;

FIG. 12 is a top plan view and partial sectional view of the base portion and loading tube of FIG. 11;

FIG. 14 is a side elevation of a loading ram suitable for use with the waste/recyclables loading device of the present invention;

FIG. 15 is a top plan view of the loading ram of FIG. 14; and

FIG. 16 is an end elevation of the loading ram of FIGS. 14 and 15.

DESCRIPTION OF THE PREFERRED EMBODIMENTS

Figure 1:
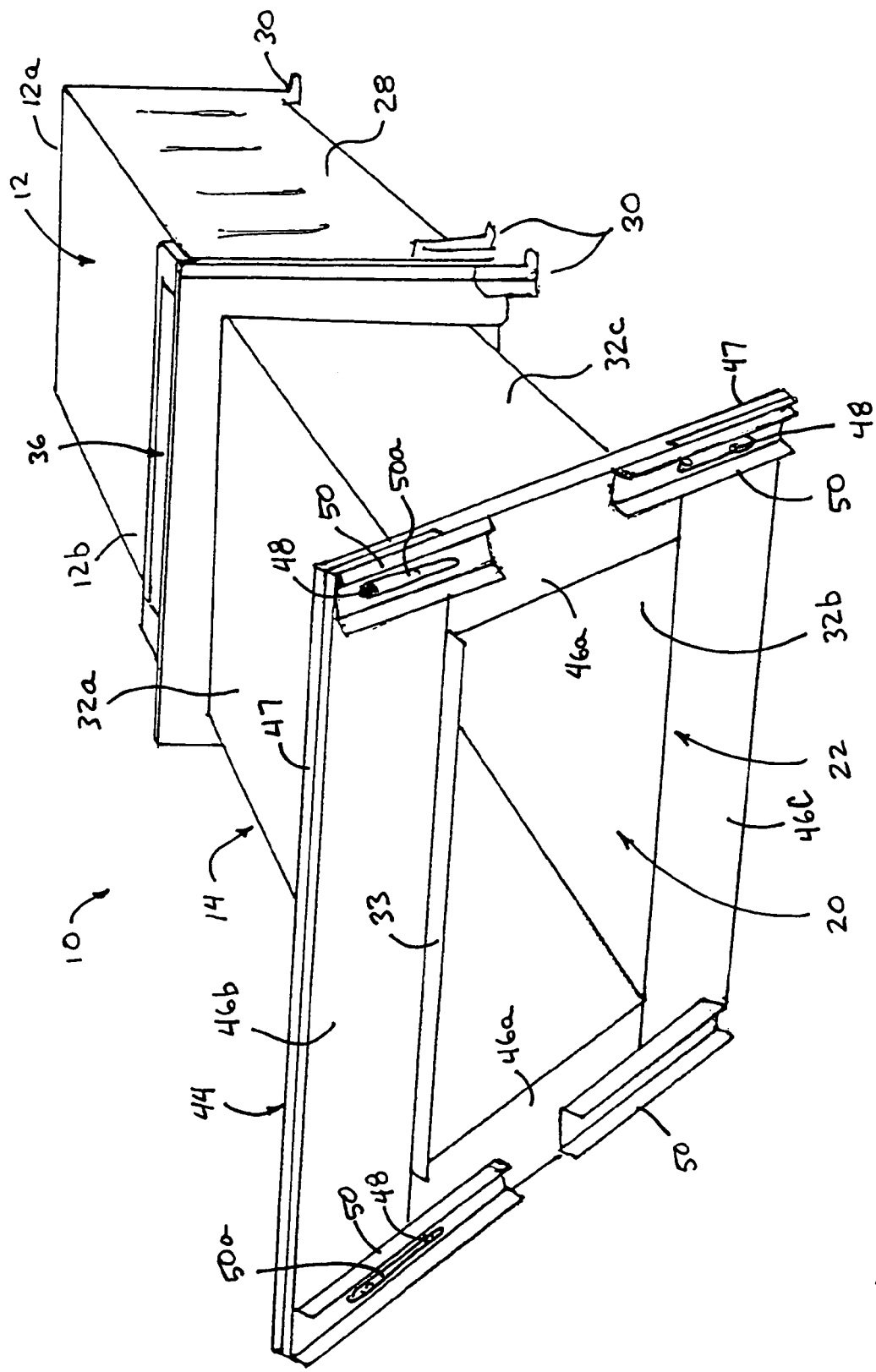
FIG. 1 is a perspective view of a waste/recyclables loading device in accordance with the present invention.
Figure 10:
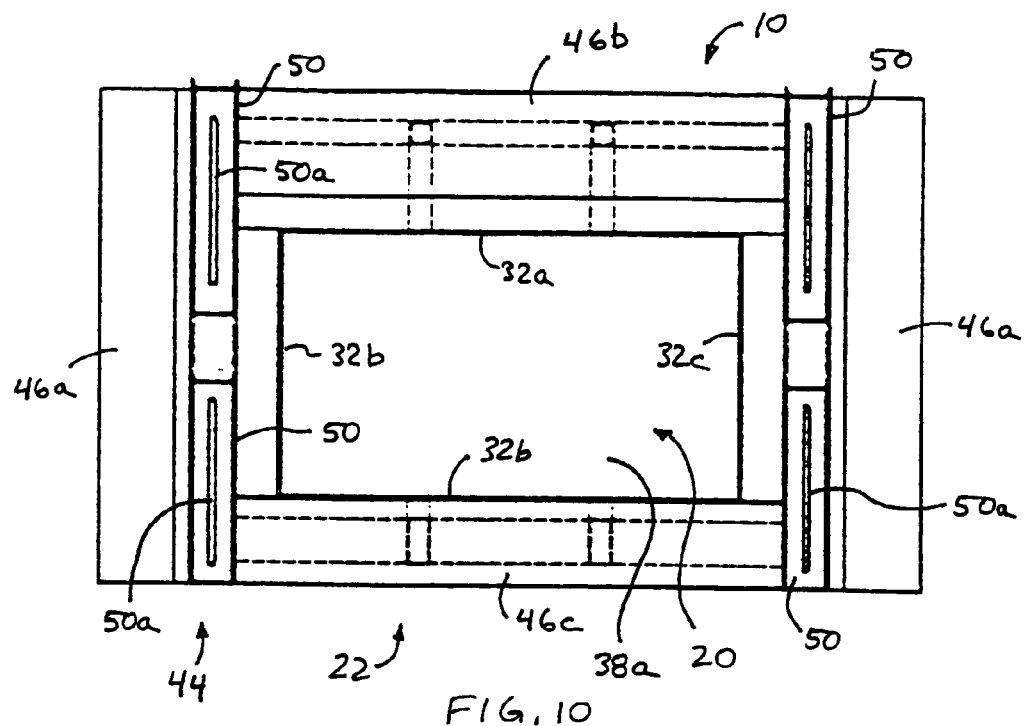
FIG. 10 is an end elevation of the discharge end of the waste/recyclables loading device of FIGS. 8 and 9.

Referring now to the drawings and the illustrative embodiments depicted therein, a waste and/or recyclables loading device or machine or apparatus 10 includes a base portion 12 and a loading tube or snout 14 extending from the base portion 12 (FIGS. 1-7). A movable or extendable/retractable ram 16 (FIGS. 8, 9 and 14-16) is positioned within base portion 12 and loading tube 14 and is movable to move or push waste and/or recyclable material 18, such as recyclables, paper waste or newsprint or the like, along the loading tube 14 and out a discharge opening 20 at a discharge end 22 of loading tube 14 and into a container, such as a common transport truck trailer 24 (FIGS. 2-5) or the like, as discussed below. The loading tube or snout 14 extends a substantial distance into the truck trailer 24 when the trailer is positioned at the loading device 10. The discharge end 22 of loading tube 14 is angled generally downwardly from vertical so that the discharge opening 20 opens generally downwardly to discharge the waste material generally downwardly into the container or truck trailer and to limit upward movement of the discharged waste, as also discussed below.

The container or trailer may comprise any type of known or conventional truck trailer, and may comprise a non-reinforced or thin-walled trailer that does not include structural reinforcements that are typically included with trailers for receiving compacted trash. Although shown and described as loading a truck trailer, it is envisioned that the loading device may be used to load waste/recyclable material, such as paper waste or glass or the like, into other types of containers or compartments, without affecting the scope of the present invention.

Base portion 12 comprises a framework 26 and a housing 28 generally around and over framework 26 to substantially encase the framework 26 and the ram 16. Framework 26 includes a cross member or support 26a at a base end 12a of base portion 12 and a support platform 26b generally at or near the opposite end 12b of base portion 12 for mounting and supporting the ram 16, as discussed below. Base portion 12 also includes support members or feet or legs 30 that may be secured to the floor or support surface of the loading station or dock to secure the base portion 12 and thus the loading device 10 at the dock. Optionally, support members 30 may comprise adjustable legs that may adjust the height of the respective end of the base portion to adjust the height and angle of the base portion 12 and loading tube 14 relative to the truck trailer, in order to adjust the orientation of the loading tube so that it is generally parallel to the floor of the truck trailer. The adjustable legs may be manually adjustable or may be adjustable via a hydraulic cylinder or actuator or the like, or via any other means, without affecting the scope of the present invention.

An inner end 14a of loading tube 14 is mounted or attached to end 12b of base portion 12 such that loading tube extends from base portion 12 and is generally aligned with the chamber within base portion 12. Loading tube 14 provides a generally hollow tubular member that has four sidewalls 32a-d that form a generally rectangular member extending from base portion 12. However, other shaped tubular members, such as circular or oval or other shapes, may be implemented without affecting the scope of the present invention. Loading tube 14 extends a substantial amount from base portion 12, such as approximately eight feet or more. In the illustrated embodiment, the upper wall 32a of loading tube 14 extends approximately twelve feet from base portion 12 so that the discharge opening 20 is substantially within the truck trailer 24 when the trailer is positioned at the loading device 10. As can be seen with reference to FIGS. 11 and 13, loading tube 14 may include a plurality of guides or slats or wear bars 34 extending along the inner surface of at least some of the sidewalls, such as along the inner surface of the lower wall 32b and the side walls 32c, 32d, to guide the ram 16 along the loading tube 14 and to limit waste or debris from being missed by the ram as the ram moves along the loading tube toward the discharge end 22, as discussed below.

Discharge end 22 is angled relative to the longitudinal axis 14b (FIG. 6) of loading tube 14 such that the discharge end 22 and discharge opening 20 are facing generally downwardly and at an angle A relative to the longitudinal axis 14b. The downward angle (such as the angle B relative to a generally vertical plane C) is desirably sufficient to cause the waste to be discharged in a generally downward direction and to limit upward movement of the discharged waste/recyclables. In the illustrated embodiment, the angle A is approximately forty-five degrees relative to the longitudinal axis 14b. However, other angles, such as, for example, an angle within the range of approximately twenty degrees to approximately seventy degrees, may be implemented without affecting the scope of the present invention.

An input opening 36 and receiving chamber 36a is positioned at or near or adjacent to end 12b of base portion 12 or at or near or adjacent to an inner end 14a of loading tube 14 (opposite to discharge end 22). The input opening 36 and chamber 36a are configured to receive waste/recyclables 18a (FIGS. 2-5) therein, whereby the ram 16 may move the waste/recyclables along the loading tube 14 and into the truck trailer 24, as discussed below. The input opening 36 may be formed in the upper wall 32a of loading tube 14, whereby the receiving chamber 36a is merely an inner region or area of the loading tube 14 generally at or near the base end 14a of the loading tube 14. Optionally, a hopper or bin 36b may be provided at the input opening 36 to receive the waste/recyclables and guide the waste/recyclables into the input opening 36. The waste/recyclables may be provided to the hopper 36b or input opening 36 via any known means, such as via a conveyor 37 or via dumping containers or the like at and into the hopper or input opening. The waste/recyclables may then be moved or pushed along the loading tube 14 and out the discharge opening 20 by ram 16, as discussed below.

The ram 16 is initially positioned within base portion 12 when the waste/recyclables are provided into the waste receiving chamber 36a. The ram 16 may comprise any moving device that is operable or movable to move or push the waste/recyclables from the receiving chamber 36a along the loading tube 14 and out the discharge opening 20. In the illustrated embodiment, ram 16 comprises a hydraulic ram that includes a movable bulkhead 38 that is movable via extension and retraction of a hydraulic actuator 40 (FIGS. 8, 9, 14 and 15), which comprises a piston rod 40a that is movable along and within a cylinder 40b via pressurized fluid. Movable bulkhead 38 is attached to an outer end of piston rod 40a of actuator 40, while cylinder 40b is secured within base portion 12, such as at a cross member 26a of framework 26 of base portion 12. Actuator 40 may comprise a hydraulic actuator, such as one that is responsive to pressurized fluid at either end. For example, pressurized fluid may be provided at one end of the cylinder 40b to extend the actuator and at the other end of cylinder 40b to retract the actuator, such as via fluid lines 40c, which may be connected to a pump or the like (not shown). The hydraulic actuator may be capable of exerting substantial force to move the waste through the loading tube and into the truck trailer. In a preferred embodiment, the actuator may provide approximately 80,000 pounds of force at the bulkhead to move the waste/recyclables into the truck trailer and to move or slide the waste/recyclables already in the trailer along the trailer and toward the front end of the trailer to at least partially or substantially fill the trailer.

Movable bulkhead 38 comprises a push plate 38a at an end of the bulkhead or weldment. Push plate 38a is supported at the ends of a base plate 38b and opposite side plates 38c of movable bulkhead 38. An upper support 38d may extend from push plate 38a and may be supported at the opposite end of the movable bulkhead 38 via an angled support member or members 38e extending from lower or base plate 38b and upper support 38d. The base plate 38b may be initially positioned at support platform 26b of base portion 12, such that the push plate 38a is at the end of the waste receiving chamber 36a when the actuator 40 is retracted. As the movable bulkhead is moved via extension of actuator 40, the upper support or wall 38d of movable bulkhead 38 functions to substantially block or close the input opening 36, so that additional waste/recyclables or other objects or debris may not fall into the chamber and behind the push plate when the push plate is moved outward along the loading tube 14, as discussed below.

The base plate 38b and side plates 38c slide along and within loading tube 14 as the hydraulic actuator extends and retracts, as discussed below. The push plate 38a and base plate 38b and side plates 38c are dimensioned to fit within loading tube 14 and may be sized to slidably fit within the loading tube to limit or substantially preclude waste/recyclables from sliding or falling under or otherwise around the push plate as the movable bulkhead is moved along and within the loading tube.

Figure 13:
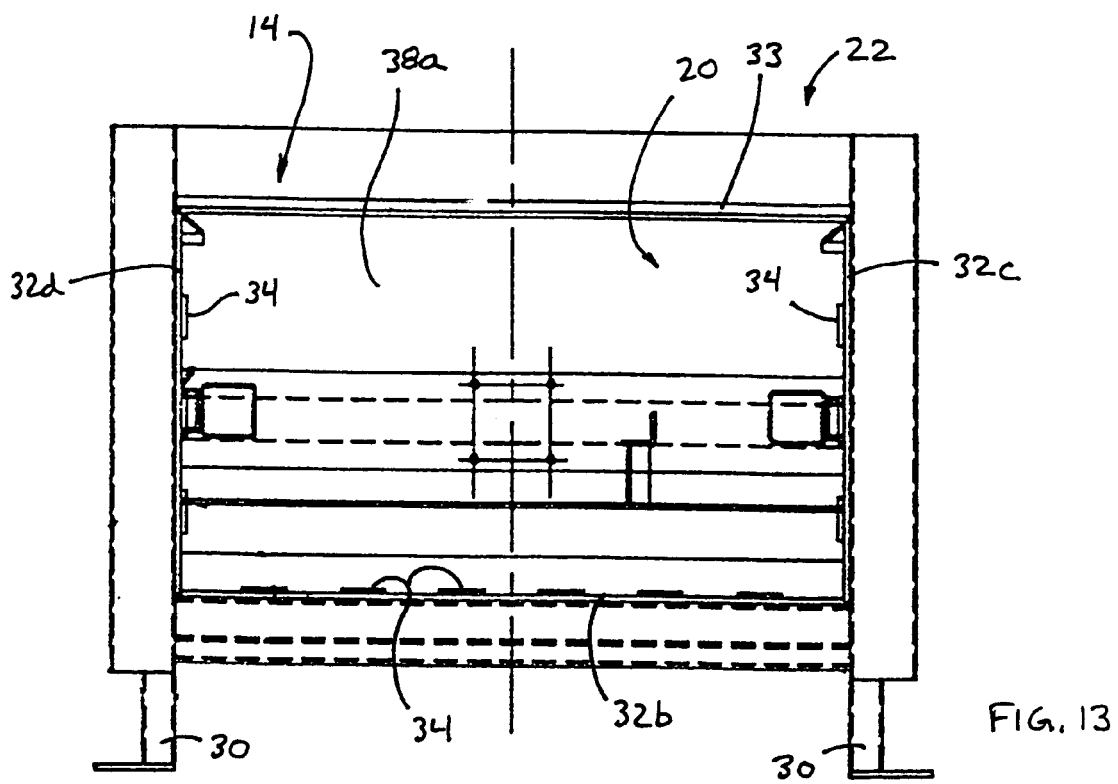
FIG. 13 is an end elevation of the base portion and loading tube of FIGS. 11 and 12.

Preferably, and as best shown in FIGS. 13 and 16, the base plate 38b and side plates 38c include spaced apart guides or slats or wear bars 42 at least partially therealong, while the loading tube 14 includes correspondingly spaced apart guides or slats or wear bars 34 at least partially therealong. The slats 42, 34 function to guide the movable bulkhead 38 along the loading tube 14 and to limit or substantially preclude the waste/recyclable material from sliding between the movable bulkhead 38 and the sides of the loading tube 14. The slats may be any size that is suitable to accomplish their desired function, and may be different sizes to accommodate the machine for different applications and waste/recyclable materials. The slats may be formed of a strong durable material, such as steel or other metallic materials, or such as strong, durable polymeric materials or the like, without affecting the scope of the present invention. The slats 42, 34 thus may function to guide the movable bulkhead as it is moved along the loading tube to push the waste or recyclable material along the loading tube and to the discharge opening 20 at the discharge end 22 of the loading tube 14.

Discharge end 22 includes a baffle or frame portion 44 that extends outwardly around the discharge opening 20 to limit upward and rearward movement of the discharged waste/recyclables. As shown in FIGS. 1, 8 and 11, the upper wall 32a of loading tube 14 may have a lip or end or flange 33 that extends forwardly beyond the face of the discharge opening 20 and baffle 44, such that the lip 33 further limits upward movement of the discharged waste/recyclables at the discharge end 22 of loading tube 14. Baffle 44 may substantially span the height and width of the truck trailer when positioned within the truck trailer to limit or substantially preclude the discharged waste/recyclables 18b (FIGS. 2-5) from moving around the baffle and toward the rear of the truck trailer or toward the base portion 12 of the loading device 10 during loading of the truck trailer. Baffle 44 includes opposite side sections or panels 46a and an upper panel 46b and a lower panel 46c positioned generally around and extending radially outwardly from discharge opening 20.

In the illustrated embodiment, baffle 44 is adjustable to adapt the baffle to substantially span the height and width of the particular trailer or container in which the baffle is to be positioned. The upper and lower panels 46b, 46c may at least partially overlap a fixed upper and lower panel 47 and may be slidably attached to side panels 46a and/or fixed panels 47 and may be secured to the side panels in the desired or appropriate location, such as via fasteners or bolts 48 (FIG. 1) or the like. In the illustrated embodiment, the upper and lower panels 46b, 46c are attached to respective slotted beams 50 with slots 50a extending therealong. The fasteners 48 may be loosened to allow the upper or lower panel 46b, 46c to be raised or lowered relative to the side panels and the fixed panels, and the fasteners may be tightened to configure the baffle to the desired dimensions. Optionally, and as can be seen in FIGS. 6 and 8, the fixed panel 47 may be part of or integral with the side panels 46a, whereby the upper and lower movable or adjustable panels 46b, 46c may be adjustable relative to a single panel or plate that generally surrounds the discharge opening. When properly or suitably adjusted, the outer reach of the baffle panels may be near to the floor and walls and ceiling of the truck trailer so that the baffle limits or substantially precludes waste/recyclable material from moving around the baffle and toward the rear of the trailer while loading the trailer.

During operation of waste loading machine or device 10, a truck trailer 24 may be backed up to the loading station or dock. The doors of the trailer may be opened so that the loading tube and discharge end of the loading tube are received within the trailer as the trailer is backed up. When the trailer is in the loading position, the loading tube may extend substantially into the trailer compartment, such as approximately eight to twelve feet or thereabouts. The trailer may be parked or secured in the appropriate or desired location so that the trailer may not move during the loading process. Optionally, the loading device may be operable in conjunction with a sensing device that senses or detects when the trailer is at the appropriate location relative to the loading device, such that the loading device will not discharge waste unless it is first determined that the trailer is in the appropriate position. If desired, the support legs of the loading device may be adjusted to adjust the angle and/or height of the loading device to accommodate the particular trailer to be loaded. As can be seen in FIGS. 2-5, the loading device may be oriented to be generally parallel to the floor of the trailer and along a lower portion of the trailer or closer to the floor of the trailer than to the ceiling of the trailer. However, if desired, the loading device may be otherwise positioned within the trailer, without affecting the scope of the present invention.

When the trailer is in the appropriate position, the loading device may begin loading waste into the trailer. The waste/recyclable material 18a may be input through the input opening and into the waste/recyclables receiving chamber of the loading device, such as via a conveyor or the like. The actuator may then be extended to move the push plate and movable bulkhead into the waste/recyclables receiving chamber and further into the loading tube to move the waste from the waste/recyclables receiving chamber along the loading tube and out the discharge opening at the discharge end of the loading tube. While the actuator is extended, any waste/recyclables that may be dropped or deposited at the input opening are substantially precluded from entering the chamber and/or the loading tube and/or the base portion because the upper portion of the movable bulkhead at least partially blocks the input opening when the bulkhead is moved outward from the base portion. As shown in FIG. 2, the discharged waste/recyclables 18b may initially pile up in front of, yet generally below, the discharge end of the loading tube.

When the movable bulkhead has moved the length of its pass or stroke, the actuator may retract to pull the movable bulkhead back toward its initial position generally within the base portion. Optionally, a limit switch or sensor may be operable to detect a desired degree of extension of the actuator and the actuator may stop and then retract when it reaches the desired degree of extension, in order to avoid bottoming out of the piston within the cylinder at the end of the stroke. When the actuator is retracted, additional waste/recyclable material may again be input into the receiving chamber via the input opening, which is again open when the movable bulkhead has been moved to its initial retracted position.

The actuator may then be extended again to move the next batch of waste/recyclable material from the receiving chamber to and through the discharge opening. Because of the angled discharge end of the loading tube, the discharged waste/recyclables may be discharged generally below and forwardly of the discharge end of the loading tube, and the baffle may limit or substantially preclude the waste material from moving around the discharge end and toward the rear of the trailer. As can be seen with reference to FIGS. 2-5, as more waste is pushed into the trailer via the movable bulkhead and actuator, the previously discharged waste is pushed further forward into the truck trailer and does not rise upward to the ceiling of the trailer. The loading device thus allows for a substantial amount of waste/recyclables to be loaded into a truck trailer, without substantially pressing the waste/recyclables toward or against the sides of the trailer and without compacting the waste/recyclables within the trailer.

When the desired amount of waste is loaded into the truck trailer, the loading device may be deactivated and the truck trailer may be moved away from the loading station or dock. As the truck trailer is moved away from the loading device, the discharged waste/recyclables may settle and move toward the rear end of the truck after the angled discharge end is moved away from the pile of waste/recyclable material. Because the loading tube extends a substantial amount into the truck trailer, such as about eight to twelve feet or thereabouts, the waste/recyclables may not move all the way to the open rear of the trailer as the trailer moves away from the loading tube, such that the loading device of the present invention limits or substantially precludes spillage of the waste/recyclable material from the truck trailer.

Optionally, the loading device may be automatically operable to discharge a desired or appropriate amount of waste/recyclables into a truck trailer and then may deactivate once that amount has been deposited into the trailer. For example, the loading device may include a counter that counts the number of times the movable bulkhead is moved toward the end of the loading tube to discharge a load of the waste material into the truck trailer. The number of loads or pushes to fill the truck trailer the desired or appropriate amount may be calculated based on the amount of waste/recyclables and volume and/or weight of the waste/recyclable material per load. As the counter approaches a number near the cut off or full amount, the device may provide a warning or alert signal and may deactivate once the appropriate or predetermined number of counts that is indicative of a full or substantially full trailer has been reached.

Optionally, once the predetermined number of counts has been reached (or once the trailer is otherwise determined to be substantially full), the loading device may deactivate and the waste/recyclables conveyor may switch to convey waste/recyclables to another loading device at another loading station or dock at or near or adjacent to the first loading device. The loading device thus may provide substantially continuous loading of trailers at the loading docks with minimal downtime between the trailers.

Therefore, the present invention provides a waste/recyclables loading device or machine that is operable to load waste/recyclable material, such as paper waste or newsprint or the like, into a container or trailer. The waste/recyclables loading device includes a snout or loading tube that extends substantially into the trailer and that has an angled discharge end, such that the waste/recyclables are discharged generally downwardly into the trailer. The snout or loading tube may include a baffle at the discharge end to limit upward movement of the waste/recyclables and to limit or substantially preclude waste/recyclables from moving around the discharge end and toward the open rear of the trailer during loading of the trailer. The waste/recyclables loading device may be operable to move waste/recyclables along the discharge tube and into the trailer via a hydraulic ram, which is extendable and retractable to move and discharge the waste/recyclables and to move to an initial position for receiving waste/recyclables in the loading device.

Changes and modifications to the specifically described embodiments may be carried out without departing from the principles of the present invention, which is intended to be limited only by the scope of the appended claims as interpreted according to the principles of patent law.

The embodiments of the invention in which an exclusive property or privilege is claimed are defined as follows:

1. A waste/recyclables loading system for loading waste or recyclables into a container, said waste/recyclables loading system comprising:

a container for receiving waste/recyclables therein, said container having walls extending therealong, said container comprising a transport truck trailer that is positionable at a loading position at a loading station;

a waste/recyclables loading device comprising a base portion, a loading tube and a pushing member;

said base portion being non-movably positioned at the loading station so as to be substantially non-movable along a support surface of the loading station;

said loading tube extending from said base portion and having a discharge end, a longitudinal axis of said loading tube being generally aligned with a longitudinal axis of said container when said container is positioned at the loading station, said container having an opening at a rear end thereof and said container being configured to receive said loading tube through said opening at said rear end of said container and into said container as said container is moved toward the loading position at the loading station, said loading tube being configured to be received in said container when said container is at the loading position such that said discharge end is substantially within said container, said discharge end having a discharge opening that is open at a downwardly facing angle relative to a longitudinal axis of said loading tube;

said pushing member being movable within and along said loading tube in response to an actuator to push waste or recyclables along said loading tube to said discharge end and out said downwardly angled discharge opening and into said container; and said loading device further comprising a flange extending radially outwardly and at least partially around said loading tube and generally at or near said discharge end, said flange being angled at a downwardly facing angle relative to said longitudinal axis of said loading tube, said flange comprising at least one plate portion that extends radially outward from said loading tube and at least substantially spans a gap between said loading tube and said walls of said container so as to provide a stop surface at least partially around said loading tube to limit movement of discharged waste or recyclables between said loading tube and said walls of said container and toward said base portion during loading of the waste or recyclables into said container.

2. The waste/recyclables loading system of claim 1, wherein said loading device includes an input at said loading tube remote from said discharge end, said pushing member being movable to push waste or recyclables that is received at said input toward said discharge end.

3. The waste/recyclables loading system of claim 1, wherein said flange at least partially engages at least one of said walls of said container to limit movement of the discharged waste or recyclables between said loading tube and said at least one of said walls of said container and toward said base portion.

4. The waste/recyclables loading system of claim 1, wherein said flange is adjustable to adjust a degree of radial extension of said flange relative to said loading tube to adapt said flange for use in different sized containers, said flange being adjustable to adapt at least one of a lateral dimension and a vertical dimension of said flange to adapt said flange to substantially span the corresponding dimension of said container between said loading tube and at least one of said walls of said container.

5. The waste/recyclables loading system of claim 1, wherein said loading device is adjustable to adjust an angle of said longitudinal axis of said loading tube relative to said container.

6. The waste/recyclables loading system of claim 1, wherein said actuator comprises a hydraulic actuator that is operable to extend and retract to move a push plate of said pushing member in response to pressurized fluid.

7. The waste/recyclables loading system of claim 1, wherein said loading tube is oriented generally horizontally and said discharge opening of said discharge end is at a downwardly facing angle within the range of approximately 25 degrees to 75 degrees with respect to horizontal.

8. The waste/recyclables loading system of claim 1, wherein said loading tube extends at least approximately eight feet into said container when said container is positioned at said loading device.

9. The waste/recyclables loading system of claim 1, wherein said container comprises a non-reinforced transport truck trailer.

10. The waste/recyclables loading system of claim 1, wherein said at least one plate portion comprises opposite side panels, an upper panel and a lower panel positioned generally around and extending generally radially outwardly from said loading tube.

11. A method for loading waste or recyclables into a container, said method comprising:

providing a waste/recyclables loading device having a base portion and a loading tube extending from said base portion, said loading tube having a discharge end opposite to said base portion, said discharge end having a discharge opening that is at a downwardly facing angle relative to a longitudinal axis of said loading tube, said loading device having a flange extending radially outwardly from said loading tube and at least partially around said loading tube and generally at or near said discharge end, said loading device including an actuator that is operable to move a pushing member within and along said loading tube;

non-movably positioning said base portion at a loading station so that said base portion is substantially non-movable along a support surface of the loading station;

generally aligning a longitudinal axis of a transport truck trailer with said longitudinal axis of said loading tube;

moving said transport truck trailer so as to receive said loading tube into said transport truck trailer and positioning said transport truck trailer at said waste/recyclables loading device such that said discharge end of said loading tube is substantially within said transport truck trailer, said transport truck trailer having a plurality of walls extending therealong, said flange extending radially outwardly from said loading tube and at least substantially spanning a gap between said loading tube and said walls of said transport truck trailer when said transport truck trailer is moved to receive said loading tube therein, said flange comprising at least two panel portions that provide a stop surface at least partially around said loading tube to limit movement of discharged waste or recyclables between said loading tube and said walls of said transport truck trailer and toward said base portion during loading of the waste or recyclables into said transport truck trailer;

loading waste or recyclables into said waste/recyclables loading device;

moving the waste or recyclables along said loading tube via movement of said pushing member within and along said loading tube in response to actuation of said actuator to said discharge end and into said transport truck trailer;

discharging the waste or recyclables from said discharge opening in a generally downward direction from said angled discharge opening; and limiting movement of the discharged waste or recyclables between said loading tube and said walls of said transport truck trailer and toward said base portion via said stop surface of said flange.

12. The method of claim 11, wherein said flange is configured at a downwardly facing angle relative to a longitudinal axis of said loading tube to limit upward movement of the discharged waste or recyclables between said loading tube and said at least one of said walls of said transport truck trailer.

13. The method of claim 11 including adjusting a degree of radial extension of said flange relative to said loading tube to adapt said flange for use in different transport truck trailers, said flange being adjustable to adapt at least one of a lateral dimension and a vertical dimension of said flange relative to said loading tube to adapt said flange to the corresponding dimension of said transport truck trailer.

14. The method of claim 11 including adjusting an angle of the longitudinal axis of said loading tube relative to the transport truck trailer.

15. The method of claim 11, wherein moving the waste or recyclables comprises extending a hydraulic actuator via pressurized fluid.

16. The method of claim 15 including retracting said actuator and loading more waste or recyclables into said waste/recyclables loading device.

17. The method of claim 11, wherein positioning a transport truck trailer at said waste/recyclables loading device comprises moving a transport truck trailer toward said waste/recyclables loading device such that said discharge end of said loading tube is substantially within said transport truck trailer.

18. The method of claim 17, wherein positioning a transport truck trailer comprises moving a transport truck trailer toward said waste/recyclables loading device such that said discharge end of said loading tube is at least approximately eight feet within said transport truck trailer.

19. The method of claim 17, wherein loading, moving and discharging waste or recyclables comprises loading, moving and discharging paper waste or recyclables.

20. The method of claim 11, wherein positioning a transport truck trailer at said waste/recyclables loading device comprises positioning a transport truck trailer at said waste/recyclables loading device such that said discharge end of said loading tube is substantially within said transport truck trailer and such that said flange at least partially engages at least one of said walls of said container to limit movement of the discharged waste or recyclables between said loading tube and said at least one of said walls of said container and toward said base portion.

21. A waste/recyclables loading system for loading paper waste or recyclables into a truck trailer, said waste/recyclables loading system comprising:
   a truck trailer for receiving waste/recyclables therein, said truck trailer being positionable at a loading position at a loading station;
   a waste/recyclables loading device comprising a base portion, a loading tube and an actuator;
   said base portion being non-movably positioned at a loading station so as to be substantially non-movable along a support surface of the loading station;
   said loading tube extending from said base portion and having a discharge opening at a discharge end, a longitudinal axis of said loading tube being generally aligned with a longitudinal axis of said truck trailer when said truck trailer is positioned at the loading station, said truck trailer having an opening at a rear end thereof and said truck trailer being configured to receive said loading tube through said opening at said rear end of said truck trailer and into said truck trailer as said truck trailer is moved toward the loading position at the loading station, said loading tube being configured to be at least approximately six feet into said truck trailer from said rear of said truck trailer when said truck trailer is at the loading position;
   said loading device further comprising a flange extending radially outward and at least partially around said loading tube and at or near said discharge end of said loading tube, said flange being adjustable to adjust a degree of radial extension of said flange relative to said longitudinal axis of said loading tube to adapt a radial dimension of said flange for use in different sized truck trailers, said flange at least substantially approaching at least one wall of said truck trailer to at least partially seal said flange at said at least one wall of said truck trailer when said flange is adjusted to a selected degree of radial extension, said at least one wall comprising at least one of a side wall, a floor and a ceiling of said truck trailer;
   said loading device further comprising an input at an end of said loading tube at said base portion, said input being configured to receive paper waste or recyclables therein; and
   said actuator being extendable and retractable to move a push plate to move received paper waste or recyclables from said input and along said loading tube toward said discharge end and out said discharge opening and into said truck trailer.

22. The waste/recyclables loading system of claim 21, wherein said flange is configured at a downwardly facing angle relative to a longitudinal axis of said loading tube such that said flange faces at least partially downward to limit upward movement of waste or recyclables being discharged into said truck trailer.

23. The waste/recyclables loading system of claim 21, wherein said discharge end is downwardly angled relative to said longitudinal axis of said loading tube such that said discharge opening is directed at least partially downward.

24. The waste/recyclables loading system of claim 21, wherein said flange is adjustable to adapt at least one of a lateral dimension and a vertical dimension of said flange to adapt said flange so that said flange extends radially outward to substantially span the corresponding dimension between said loading tube and a wall of said truck trailer that is positioned at the loading station.

25. The waste/recyclables loading system of claim 21, wherein said loading device is adjustable to adjust the angle of said longitudinal axis of said loading tube relative to said truck trailer.

26. The waste/recyclables loading system of claim 21, wherein said loading tube is oriented generally horizontally and said discharge end is at a downwardly facing angle within the range of approximately 25 degrees to 75 degrees with respect to horizontal.

27. The waste/recyclables loading system of claim 26, wherein said discharge end of said loading tube is at least approximately eight feet into said truck trailer from the rear of said truck trailer positioned at said loading station.

28. The waste/recyclables loading system of claim 27, wherein said discharge end is at a downwardly facing angle of approximately 45 degrees with respect to horizontal.

* * * * *

UNITED STATES PATENT AND TRADEMARK OFFICE
CERTIFICATE OF CORRECTION

| | | |
|---|---|---|
| PATENT NO. | : 7,275,906 B1 | Page 1 of 1 |
| APPLICATION NO. | : 10/895192 | |
| DATED | : October 2, 2007 | |
| INVENTOR(S) | : Pool | |

It is certified that error appears in the above-identified patent and that said Letters Patent is hereby corrected as shown below:

In the Claims

Column 9:
Claim 1, Line 19, "position" should be --station--

Signed and Sealed this
Twenty-sixth Day of November, 2013

Margaret A. Focarino
*Commissioner for Patents of the United States Patent and Trademark Office*